(12) United States Patent
Terrenoire et al.

(10) Patent No.: US 8,802,759 B2
(45) Date of Patent: Aug. 12, 2014

(54) BINDERS FOR COATINGS, HAVING HIGH WATER VAPOR PERMEABILITY

(75) Inventors: Alexandre Terrenoire, Sprendlingen (DE); Roelof Balk, Boehl-Iggelheim (DE); Harm Wiese, Laudenbach (DE); Arno Tuchbreiter, Speyer (DE); Timothy Francis, St. Leon-Rot (DE); Hans-Werner Schmidt, Bayreuth (DE); Andreas Bernet, Bayreuth (DE)

(73) Assignee: BASF SE, Ludwigshafen (DE)

( * ) Notice: Subject to any disclaimer, the term of this patent is extended or adjusted under 35 U.S.C. 154(b) by 228 days.

(21) Appl. No.: 13/254,411

(22) PCT Filed: Mar. 9, 2010

(86) PCT No.: PCT/EP2010/052961
§ 371 (c)(1),
(2), (4) Date: Sep. 1, 2011

(87) PCT Pub. No.: WO2010/102993
PCT Pub. Date: Sep. 16, 2010

(65) Prior Publication Data
US 2012/0010338 A1 Jan. 12, 2012

(30) Foreign Application Priority Data
Mar. 12, 2009 (EP) ..................................... 09154991

(51) Int. Cl.
*C08K 5/20* (2006.01)

(52) U.S. Cl.
USPC ........................................... 524/217; 524/728

(58) Field of Classification Search
USPC .................................................. 524/217, 728
See application file for complete search history.

(56) References Cited

U.S. PATENT DOCUMENTS

| 5,596,035 A | 1/1997 | Desor et al. |
| 6,031,038 A | 2/2000 | Baumstark et al. |

FOREIGN PATENT DOCUMENTS

| DE | 44 39 457 | 4/1995 |
| EP | 0 655 481 | 5/1995 |
| EP | 0 697 423 | 2/1996 |

OTHER PUBLICATIONS

International Search Report Issued May 3, 2010 in PCT/EP10/052961 Filed Mar. 9, 2010.

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

The present invention relates to binders based on polymer dispersions and terephthalic bisamides with high water vapor transmission, and also to their use in formulations, especially for wood coatings.

20 Claims, No Drawings

BINDERS FOR COATINGS, HAVING HIGH WATER VAPOR PERMEABILITY

CROSS REFERENCE TO RELATED APPLICATION

This application is a 371 of PCT/EP2010/052961, filed on Mar. 9, 2010, and claims priority to European Patent Application No. 09154991.5, filed on Mar. 12, 2009.

The present invention relates to binders based on polymer dispersions and terephthalic bisamides with high water vapor transmission, and also to their use in formulations, especially for wood coatings.

Important requirements of coating systems are first a good water resistance and second a sufficient water vapor transmissibility. Water resistance means increasing the resistance of the coating toward absorption of water, since water causes softening of the coating and a loss of substrate adhesion, the substrate thus being exposed to the penetration of water. Effective water resistance, however, must prevent this. If moisture nevertheless enters the substrate, a sufficient transmissibility of the coating for water vapor ought to guarantee rapid redrying of the substrate. It is therefore necessary for water absorption and water vapor transmission rate (WVT) to be in a balanced proportion (see H. Künzel, Beurteilung des Regenschutzes von Außenbeschichtungen, Institut für Bauphysik der Fraunhofer-Gesellschaft, Mitteilung 18, 1978). Where the coatings are based on aqueous binders, such as polymer dispersions, the WVT of the dispersion film, in conjunction with its water resistance, is accorded critical importance.

In order to achieve good water resistance and hence good weathering stability on the part of the coating, the aqueous binders have generally been developed such that they are preferably based on hydrophobic monomers and comprise low fractions of hydrophilic components. It is often the case, however, that when compared directly, hydrophilic systems exhibit a higher WVT than hydrophobic ones. The water absorption of hydrophilic systems, however, is higher. For wood coatings it is therefore more preferred to use hydrophobic systems, since this material in particular has a chemical composition—depending on variety—that makes it highly sensitive to water and susceptible to microorganism infestation, particularly in the case of a wood moisture content >20%.

It would therefore be desirable to have binders combining very good water resistance with high WVT, to guarantee rapid redrying of the substrate after coating and to prevent buildup of moisture beneath the coating (J. Heinz, Holzschutz, ROTO Fachbibliothek, Vol. 2, 1998, Wegra Verlag and J. Sell et al., Werkstoff Holz, Spektrum der Wissenschaft, No. 4 (1997) 86-89).

In woodstains the WVT can be adjusted primarily through the choice of binder and the dry film thickness. The greater the film thickness, the lower the WVT. A distinction is made between low-build and high-build woodstains. For low-build stains, a low viscosity and a low solids content (<30%) are characteristic. Materials of this kind can be used to set dry film thicknesses of up to 25 μm on threefold application. High-build woodstains are stains with a high binder content and a high viscosity. Target dry film thicknesses are up to 120 μm. Common to both types of stain is the very high binder content. The choice of binder therefore has a decisive influence on the WVT. The more polar the binder, the higher the WVT.

The influence of emulsifiers, pigments, and additives on the WVT is small in comparison to the binder. The rule here as well is that the higher the polarity, the greater the WVT.

It was an object of the present invention to provide binders which are based on aqueous polymer dispersions and combine very good water resistance with enhanced water vapor transmission.

Surprisingly it has been found that polymer dispersions which comprise terephthalic bisamides of the general formula I as additives are notable in relation to the binders of the prior art, with comparable colloidal stability in the case of formulations in the form of emulsion paints, by greater water vapor transmission.

It has been known for some considerable time that aromatic and aliphatic compounds with amide units and/or urea units are capable of assembling in a solvent, through intermolecular, noncovalent interactions, to form anisotropic, supramolecular aggregates such as, for example, ribbon, rod or fiber structures [Weiss, R. G.; Terech, P. Molecular Gels: Materials with self-assembled fibrillar networks; Springer: Dordrecht, Neth.; 2006]. A large proportion of the systems described in the literature exhibit this behavior only for solvents which are organic and usually apolar [a] Terech, P; Weiss, R. G. Low molecular mass gelators of organic liquids and the properties of their gels. Chem. Rev. 1997, 97, 3133; b) Sangeetha, N. M.; Maitra, U. Supramolecular gels: functions and uses. Chem. Soc. Rev. 2005, 34, 821; c) Hanabusa, K. Development of organogelators based on supramolecular chemistry. Springer Series in Materials Science (Macromolecular Nanostructured Materials) 2004, 78, 118-137; d) van Esch, J. H.; Feringa, B. L. New functional materials based on self-assembling organogels: from serendipity towards design. Angew. Chem. Int. Ed. 2000, 39, 2263]. In recent years, however, intense efforts have been made to develop structurally related classes of substance that are suitable for aqueous solvents. The hydrogelators discovered as a result of such efforts generally likewise possess one or more amide units and/or urea units [a) Estroff, L. A.; Hamilton, A. D. Water Gelation by Small Organic Molecules. Chem. Rev. 2004, 104, 1201; b) de Loos, M.; Feringa, B. L.; van Esch, J. H. Design and Application of Self-Assembled Low Molecular Weight Hydrogels. Eur. J. Org. Chem. 2005, 3615].

It is known that bisamides can be used as a pigment dispersant (JP 9272811-A), as a demulsifier in water-in-oil emulsions (U.S. Pat. No. 5,117,058), and as a chain-length regulator in polymerization reactions (DE-A 4040468, DE-A 4040469).

The use of the existing compounds in aqueous polymer dispersions, however, led to instability and formation of coagulum—attributable to incompatibility between these amphiphilic compounds and the stabilizing system of the polymer dispersions.

Surprisingly, however, it has now been found that the bisamides specified at the outset not only are compatible with the aqueous polymer dispersions but also lead to the aforementioned enhancement of the WVT.

The present invention first provides aqueous polymer dispersions P comprising 0.1% to 10%, preferably 1% to 5%, by weight of additives of the general formula I

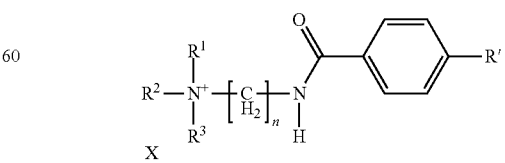

where $R^1$ to $R^6$ are H, $C_1$-$C_n$ alkyl, it being possible for $R^1$ to $R^6$ to be either identical or different,

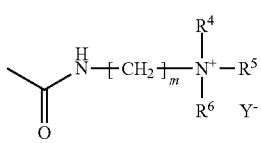

R'=

X and Y are Cl, Br or I and n and m are 1-8, the aqueous polymer dispersion being obtainable by free-radical aqueous emulsion polymerization of a monomer mixture comprising a) 45 to 70 parts by weight of at least one monomer whose homopolymer has a glass transition temperature $T_g<20°$ C., b) 30 to 55 parts by weight of at least one monomer whose homopolymer has a glass transition temperature $T_g>50°$ C., and c) 0 to 30 parts by weight of further monomers.

The aqueous polymer dispersions of the invention are suitable as binder compositions for the formulation of emulsion paints featuring increased water vapor transmission.

Accordingly, the present invention further provides for the use of an aqueous polymer dispersion as defined above as a binder composition, in coating materials, more particularly for wood coatings, and also provides coating materials comprising the binder composition of the invention.

The glass transition temperature, $T_g$, is the limiting value of the glass transition temperature, toward which said temperature tends with increasing molecular weight, according to G. Kanig (Kolloid-Zeitschrift & Zeitschrift für Polymere, Vol. 190, p. 1, equation 1); it is determined by the DSC method (Differential Scanning calorimetry, 20 K/min, midpoint). The $T_g$ values for the homopolymers of the majority of monomers are known and are listed in, for example, Ullmann's Encyclopedia of Industrial Chemistry, VCH Weinheim, 1992, 5th Edn., Vol. A21, p. 169; other sources of homopolymer glass transition temperatures include, for example, J. Brandrup, E. H. Immergut, Polymer Handbook, 1st Edn., J. Wiley, New York 1966, 2nd Edn., J. Wiley, New York 1975, and 3rd Edn., J. Wiley, New York 1989.

The polymers present in the binders are synthesized to an extent of 45 to 70 parts by weight, preferably 50 to 65 parts by weight, of monomers a). Suitable monomers a) are, for example, branched and unbranched, ethylenically unsaturated $C_3-C_{10}$ olefins, $C_1-C_{10}$ alkyl acrylates, $C_5-C_{10}$ alkyl methacrylates, $C_5-C_{10}$ cycloalkyl(meth)acrylates, $C_1-C_{10}$ dialkyl maleates and/or $C_1-C_{10}$ dialkyl fumarates. Preference is given to using those monomers a) whose homopolymers have glass transition temperatures of below 0° C. Particularly preferred monomers a) used are ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate or 2-propylheptyl acrylate. They are used individually or in mixtures.

The homopolymers of the monomers b) have a glass transition temperature >50° and preferably >80°, examples being styrene, α-methylstyrene, o- or p-vinyltoluene, vinyl chloride, vinylidene chloride, acrylonitrile, methacrylonitrile, and also ($C_1-C_4$) alkyl esters or cycloalkyl esters of methacrylic acid, examples being methyl methacrylate, cyclohexyl methacrylate, isobornyl methacrylate, and tert-butyl methacrylate. They are used individually or in mixtures in amounts of 30 to 55 parts by weight, and preferably 35 to 50 parts by weight.

The binder polymers of the invention may further comprise, as monomers c), ethylenically unsaturated monomers which are able to form anionic groups. These groups are preferably carboxylate, phosphonate or sulfonate groups. Preferred monomers c) monoethylenically unsaturated alkyl- or arylsulfonic acids such as vinylsulfonic acid, methallylsulfonic acid, vinylbenzenesulfonic acid, acrylamidoethanesulfonic acid, acrylamidopropanesulfonic acid, 2-sulfoethyl (meth)acrylate, sulfopropyl(meth)acrylate, and also α,β-unsaturated $C_3-C_6$ carboxylic acids, α,β-unsaturated $C_4-C_8$ dicarboxylic acids or their anhydrides, such as acrylic acid, methacrylic acid, crotonic acid, fumaric acid, maleic acid, maleic anhydride, itaconic acid and itaconic anhydride, and also the alkali metal salts or ammonium salts of said monomers, more particularly their sodium salts.

As monomers c) it is additionally possible to use the amides and the hydroxyl alkyl esters of the α,β-unsaturated $C_3-C_6$ carboxylic acids, more preferably acrylamide, methacrylamide, 2-hydroxyethyl acrylate, 2-hydroxyethyl methacrylate, 2-hydroxypropyl(meth)acrylate or 1,4-butanediol monoacrylate.

Further suitable monomers c) are N-vinylpyrrolidone, N-(2-methacryloyloxyethyl)-ethyleneurea, N-(2-acryloyloxyethyl)ethyleneurea, 2-acetoacetoxyethyl acrylate, 2-acetoacetoxyethyl methacrylate, and diacetoneacrylamide.

The monomers c) can be used individually or else in combinations of, for example, acids and amides.

Besides the stated monomers a), b) and c) it is also possible for the binder polymers of the invention to comprise further monomers, in order to give the respective coating materials a higher strength. These monomers normally contain at least one epoxy group or at least two nonconjugated ethylenically unsaturated double bonds. Examples thereof are monomers containing two vinyl radicals, monomers containing two vinylidene radicals, and monomers containing two alkenyl radicals. Particularly advantageous in this context are the diesters of dihydric alcohols with α,β-mono-ethylenically unsaturated monocarboxylic acids, among which acrylic and methacrylic acid are preferred. Examples of monomers of this kind containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, 1,6-hexane glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, 1,6-hexane diglycol dimethacrylate, and also divinylbenzene, vinyl methacrylate, vinyl acrylate, allyl methacrylate, allyl acrylate, diallyl maleate, diallyl fumarate, cyclopentadienyl acrylate, triallyl cyanurate or triallyl isocyanurate. Further examples of such monomers are also monomers comprising siloxane groups, such as the vinyltrialkoxysilanes, e.g., vinyltrimethoxysilane, vinyltriethoxysilane, alkylvinyldialkoxysilanes or (meth)acryloyloxyalkytrialkoxysilanes, e.g., (meth)acryloyloxyethyltrimethoxysilane and (meth)acryloyloxypropyltrimethoxysilane. The stated monomers can be used in amounts of 0.05 to 1, preferably 0.05 to 0.5, parts by weight, based on 100 parts by weight of monomers a) plus b).

The terephthalic bisamides used as an additive are prepared by reacting terephthaloyl dihalides with (N,N-dialkylamino) alkylamines in a molar ratio of 1:2, preferably in tetrahydrofuran (THF) or in mixtures of THF and other organic solvents, such as dichloromethane, at room temperature. Alternatively the reaction can be conducted in bulk or in other solvents or solvent mixtures without a THF component, as for example in toluene, acetone, dichloromethane or chloroform.

The additives are used preferably in amounts of 0.1% to 10%, more preferably of 1% to 5%, by weight.

The aqueous polymer dispersions used as binders of the invention are carried out by free-radical emulsion polymerization of the stated monomers a) to c) in the presence of 0.1% to 0.5%, preferably 0.1% to 0.4%, and more particularly 0.1% to 0.3%, by weight, based in each case on the amount of the monomers a) and b), of at least one free-radical polymerization initiator.

Free-radical polymerization initiators contemplated include all of those which are capable of triggering a free-radical aqueous emulsion polymerization. These may be peroxides, hydroperoxides, e.g., alkali metal peroxodisulfates, or azo compounds. Use is also made of combined systems, composed of at least one organic reducing agent and at least one peroxide and/or hydroperoxide, examples being tert-butyl hydroperoxide with the sodium salt of hydroxymethanesulfonic acid, hydrogen peroxide with ascorbic acid, or sodium peroxodisulfate with sodium disulfite. Preferred combined systems further comprise a small amount of a metal compound which is soluble in the polymerization medium and whose metallic component is able to occur in a plurality of valence states, e.g., ascorbic acid/iron(II) sulfate/hydrogen peroxide, where instead of ascorbic acid it is also possible, frequently, to use the sodium salt of hydroxymethane-sulfinic acid, sodium sulfite, sodium hydrogensulfite or sodium bisulfite, and, instead of hydrogen peroxide, to use tert-butyl hydroperoxide or alkali metal peroxodisulfate and/or ammonium peroxodisulfate. Instead of a water-soluble iron(II) salt it is common to utilize a combination of water-soluble iron salts and vanadium salts. Preferred initiators are the ammonium salts or alkali metal salts of peroxosulfates or peroxodisulfates, more particularly sodium or potassium peroxodisulfate.

For preparing the binder polymers of the invention use is optionally made, in addition to the surface-active substances that are conventional for an emulsion polymerization, of at least one nonionic emulsifier in amounts of preferably 0.5% to 10%, more particularly 1% to 8%, and more preferably 2% to 4%, by weight, based in each case on the total monomer amount. Useful nonionic emulsifiers are aromatic or aliphatic nonionic emulsifiers, examples being ethoxylated mono-, di-, and trialkylphenols (EO degree: 3 to 50, alkyl radical: $C_4$-$C_9$), ethoxylates of long-chain alcohols, (EO degree: 3 to 50, alkyl radical: $C_8$-$C_{36}$), and polyethylene oxide/polypropylene oxide block copolymers. Preference is given to using ethoxylates of long-chain alkanols (alkyl radical $C_{10}$-$C_{22}$, average degree of ethoxylation 10 to 50) and, of these, particular preference to those having a linear $C_{12}$-$C_{18}$ alkyl radical and an average degree of ethoxylation of 10 to 50, as sole nonionic emulsifiers.

Further commonplace emulsifiers are preferably anionic in nature. They include alkali metal salts and ammonium salts of alkyl sulfates (alkyl radical: $C_8$-$C_{12}$), of sulfuric monoesters with ethoxylated alkanols (EO degree: 2 to 50, alkyl radical: $C_{12}$ to $C_{18}$) and with ethoxylated alkylphenols (EO degree: 3 to 50, alkyl radical: $C_4$-$C_9$), of alkylsulfonic acids (alkyl radical: $C_{12}$-$C_{18}$) and of alkylarylsulfonic acids (alkyl radical: $C_9$ to $C_{18}$). Further suitable emulsifiers are found in Houben Weyl, Methoden der organischen Chemie, Volume XIV/1, Makromolekulare Stoffe [Macromolecular Compounds], Georg-Thieme Verlag, Stuttgart, 1961, pages 192-208).

Preferred anionic surface-active substances are also compounds of the following general formula

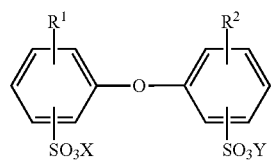

in which $R^1$ and $R^2$ are hydrogen or $C_4$-$C_{24}$ alkyl but are not simultaneously hydrogen, and X and Y may be alkali metal ions and/or ammonium ions. In the formula I $R^1$ and $R^2$ are preferably linear or branched alkyl radicals having 6 to 18 C atoms or hydrogen, and in particular have 6, 12, and 16 C atoms, $R^1$ and $R^2$ not both simultaneously being hydrogen. X and Y are preferably sodium, potassium or ammonium, with sodium being particularly preferred. Particularly advantageous compounds I are those in which X and Y are sodium, $R^1$ is a branched alkyl radical having 12 C atoms, and $R^2$ is hydrogen or the same as $R^1$. It is common to use technical-grade mixtures which have a fraction of 50% to 90% by weight of the monoalkylated product, an example being Dowfax® 2A1 (trade mark of the Dow Chemical Company). The compounds are general knowledge, from U.S. Pat. No. 4,269,749, for example, and are available commercially.

Other suitable emulsifiers are found in, for example, Houben Weyl, Methoden der organischen Chemie, Volume 14/1, Makromolekulare Stoffe, Georg Thieme Verlag, Stuttgart, 1961, pp. 192 to 208.

Suitable emulsifiers are available commercially—for example, under the trade names Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® I-SC, Lumiten® E 3065, Disponil® FES 77, Lutensol® AT 18, Steinapol® VSL, and Emulphor® NPS 25.

It is possible, furthermore, for suitable protective colloids to be used, such as, for example, polyvinyl alcohols, cellulose derivatives, or copolymers comprising vinyl-pyrrolidone. A detailed description of other suitable protective colloids is given in Houben-Weyl, Methoden der Organischen Chemie, Vol. 14/1, Makromolekulare Stoffe, Georg-Thieme-Verlag, Stuttgart, 1961, p. 411-420. The total amount of surface-active substances is usually up to 30%, preferably 0.5% to 10%, and more preferably 2% to 6%, by weight, based on the monomers to be polymerized.

The molecular weight of the polymers can be adjusted by addition of small amounts, generally up to 2% by weight, based on the monomers to be polymerized, of one or more molecular weight regulator substances, examples being organic thio compounds or allyl alcohols. Preference, however, is given to those polymers which have been prepared in the absence of such compounds.

The emulsion polymerization may take place either continuously or in batch mode, preferably by a semibatch process. In that case it is possible for the monomers to be polymerized to be added continuously to the polymerization batch, including by a staged or gradient procedure. Preference is given to a feed process with short feed times—that is, the monomers, preferably in aqueous emulsion form, are metered into the reaction batch over the course of 1 to 4 hours, preferably over the course of 1.5 to 3 hours.

Besides the seed-free preparation mode it is possible, in order to adjust the polymer particle size, for the emulsion polymerization to take place by the seed latex method or in the presence of a seed latex prepared in situ. Processes for this are known and can be found in the prior art (see EP-B 40 419 and also 'Encyclopedia of Polymer Science and Technology', Vol. 5, John Wiley & Sons Inc., New York, 1966, p. 847).

Thus the prior art advises including, in the feed process, a defined, finely divided seed polymer dispersion in the initial charge to the polymerization vessel and then polymerizing the monomers in the presence of the seed. In this case the seed polymer particles act as polymerization nuclei and decouple polymer particle formation from polymer particle growth. Further seed dispersion may be added during the emulsion polymerization. This produces broad size distributions of the polymer particles, which are often desirable especially in the case of polymer dispersions with a high solids content (cf. DE-A 42 13 965). Instead of adding a defined seed latex, it can also be produced in situ. For this purpose, for example, a portion of the monomers and of the initiator is included in the initial charge, together with emulsifier, and is heated to reaction temperature, forming a relatively finely divided latex. Subsequently, in the same polymerization vessel, the polymerization proper is conducted in accordance with the feed process (see also DE-A 42 13 965).

The manner in which the initiator is metered in to the emulsion polymerization is not critical. The initiator may either be included entirely in the initial charge to the polymerization vessel, or else may be added continuously or in stages in the course of the emulsion polymerization, at the rate at which it is consumed. The procedure depends both on the chemical nature of the initiator and on the polymerization temperature, and may be selected by the skilled worker in accordance with requirements. Preference is given to continuous or staged metered addition to the reaction batch.

Polymerization pressure and polymerization temperature are equally of minor importance. In general, the polymerization is conducted at temperatures between room temperature and 120° C., preferably at temperatures of 50 to 95° C., and more preferably between 70 and 90° C.

Following the polymerization reaction proper, it is generally necessary largely to free the aqueous polymer dispersions of the invention from odorous substances, such as residual monomers and other volatile organic constituents. This can be done in a conventional manner, physically, by distillative removal (more particularly via steam distillation), or by stripping with an inert gas.

Moreover, the amount of residual monomers may be lowered chemically, by free-radical postpolymerization, more particularly under the action of redox initiator systems, of the kind listed, for example, in DE-A 44 35 423, in DE-A 44 19 518, and in DE-A 44 35 422. Suitable oxidizing agents for the redox-initiated postpolymerization include, in particular, hydrogen peroxide, tert-butyl hydroperoxide, cumene hydroperoxide or alkali metal peroxide sulfates. Suitable reducing agents are sodium disulfite, sodium hydrogensulfite, sodium dithionite, sodium hydroxymethanesulfinate, formamidinesulfinic acid, acetone bisulfite (i.e., the adduct of sodium hydrogensulfite with acetone), ascorbic acid, and reducing sugar compounds, or water-soluble mercaptans, such as mercaptoethanol. The postpolymerization with the redox initiator system is carried out in the temperature range from 10 to 100° C., preferably at 20 to 90° C. The redox partners may be added to the dispersion independently of one another, completely, in portions or continuously over a period of 10 minutes to 4 hours. In order to improve the postpolymerization effect of the redox initiator systems it is also possible to add soluble salts of metals of changing valence to the dispersion, such as iron salts, copper or vanadium salts. In many cases, complexing agents are added as well, and keep the metal salts in solution under the reaction conditions.

The polymer dispersion are, lastly, neutralized with a base, such as alkali metal or alkaline earth metal hydroxides, alkaline earth metal oxides, or volatile or nonvolatile amines. The nonvolatile amines include more particularly ethoxylated diamines or polyamines, of the kind available commercially, for example, under the Jeffamine® name (Texaco Chemical Co.).

The additives of the invention with the general formula I may be added before, during or after the polymerization, either as the pure substance or as an aqueous solution. Preferably they are added after the polymerization proper.

The binder polymers of the invention generally have minimum film formation temperatures of below 10° C., preferably below 5° C., and more preferably <3° C. The average particle size of the polymer particles present in the binder dispersions, determined via light scattering, is situated preferably in the range from 50 to 300 nm, more preferably in the range from 50 to 200 nm.

The light transmittance (see below) of the dispersions is situated in general in the range from 40% to 95%, preferably in the range from 50% to 95%. Over wide ranges it correlates with the size of the dispersed particles, i.e., the greater the LT (light transmittance of a 0.01% strength by weight sample), the smaller the diameter of the dispersed particles.

The binder compositions of the invention that are employed in the coating materials comprise polymers (P) whose glass transition temperatures $T_g$ is typically in the range from 0° C. to 50° C., preferably in the range from 5° C. to 45° C., and more particularly in the range from 5° C. to 40° C.

In addition to the binder compositions, the coating formulations may comprise further adjuvants, of the kind customary in coating materials based on aqueous polymer dispersions. These adjuvants include pigments, fillers, other auxiliaries, and, if desired, additional film-forming polymers.

Examples of suitable pigments include inorganic white pigments such as titanium dioxide, preferable in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic colored pigments, examples being sepia, gamboge, Cassel brown, toluidine red, para red, Hansa yellow, indigo, azo dyes, anthraquinonoid and indigoid dyes, and also dioxazine and quinacridone, phthalocyanine, isoindolinone, and metal-complex pigments. Suitability is also possessed by synthetic white pigments with air inclusions for the purpose of increasing the light scattering, such as the Rhopaque® dispersions.

Examples of suitable fillers include aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In coating materials, of course, finely divided fillers are preferred. The fillers may be used as individual components. In practice, however, mixtures of fillers have been found particularly appropriate, examples being calcium carbonate/kaolin and calcium carbonate/talc. Glossy coating materials will generally contain only small amounts of very finely divided fillers, or comprise no fillers.

Finely divided fillers can also be used for increasing the hiding power and/or saving on use of white pigments. In order to adjust the hiding power of the hue and the depth of color it is preferred to use blends of color pigments and fillers.

The customary auxiliaries, in addition to the emulsifiers used in the polymerization, also include wetting agents or dispersants, such as sodium, potassium or ammonium polyphosphates, alkali metal salts and ammonium salts of acrylic acid or maleic anhydride copolymers, polyphosphonates, such as sodium 1-hydroxyethane-1,1-diphosphonate, and also naphthalenesulfonic acid salts, more particularly the sodium salts thereof.

Further suitable auxiliaries are flow control agents, defoamers, biocides, and thickeners. Examples of suitable thickeners include associative thickeners, such as polyurethane thickeners. The amount of the thickener is preferably less than 1% by weight, more preferably less than 0.6% by weight, based on the solids content of the coating material.

The proportion of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dry coating film in percent: $PVC=(V_P+V_F) \times 100/(V_P+V_F+V_B)$ (cf. Ullmann's Enzyklopädie der technischen Chemie, 4 Edition, Volume 15, p. 667). Coating compositions can be subdivided as follows in accordance with the PVC:

| | |
|---|---|
| highly filled interior paint, wash-resistant, white/matt | about ≥85 |
| interior paint, scuff-resistant, white/matt | about 60-85 |
| semigloss paint, silk matt | about 30-60 |
| semigloss paint, satin sheen | about 25-35 |
| gloss paint | about 15-25 |
| exterior masonry paint, white | about 45-55 |
| transparent varnish | 0 |

The coating materials of the invention may be present for example in the form of an unpigmented system (transparent varnish) or a pigmented system.

The coatings produced from the coating materials of the invention are distinguished by high water resistance in conjunction with good WVT and effective adhesion. Said coatings, moreover, generally have a high flexibility and a low friability, which allows them, for example, to conform to a working substrate.

The examples given below are intended to illustrate the invention, but without imposing any restriction on it.

EXAMPLES

Analysis

The particle size (z-average) of the polymer particles was determined by dynamic light scattering on a 0.01% by weight dispersion at 23° C. by means of an Autosizer IIc from Malvern Instruments, England. The parameter specified is the average diameter of the cumulant evaluation (cumulant z-average) of the measured autocorrelation function.

The light transmittance (LT) was determined on a 0.01% by weight dispersion at a film thickness of 25 mm using white light in a commercial photometer. Measurement is made relative to water, which is assigned an LT of 100%.

The minimum film formation temperature (MFFT) was determined in a method based on Ullmann's Enzyklopädie der technischen Chemie, 4th Edn., Vol. 19, Verlag Chemie, Weinheim (1980), p. 17. The measuring apparatus used was a film-forming bar (a metal plate to which a temperature gradient is applied). Filming took place with a wet film thickness of 1 mm. The minimum film formation temperature reported is the temperature at which the film begins to become fissured.

The water vapor transmission rate (WVT) of the free dispersion films was measured at 23° C. and 85% relative humidity using a MOCON PERMATRAN-W®3/33 instrument, based on the carrier gas method of ASTM F-1249. The transmission rates measured were subsequently converted for 98% relative humidity, on the assumption that this rate increases linearly with increasing atmospheric humidity.

The WVT of the films was also measured in accordance with ASTM E 96/E 96M-05, with a controlled-atmosphere chamber (Votsch VC 7060) at 23° C. and a relative humidity of 98%. Three specimens per sample were subjected to measurement in each case. The desiccant used was calcium chloride anhydride and the sealing agent used was paraffin wax.

The WVT of coating formulations was tested in accordance with prEN 1062-2 and ISO DS 7783. The method describes what is called the cup process, whereby the WVT is determined by gravimetry. The measurements were made with a humidity gradient from 50% to 93% relative humidity, and at 23° C. For each coating, at least 3 parallel specimens were tested, and also a blank value for the substrate, likewise on 3 parallel specimens. The substrate used was smooth white HF white Bristol board, type A 21717, available from CIT Büro Schule, Hamburg.

1. General Procedure for Preparing the Compound of the General Formula I

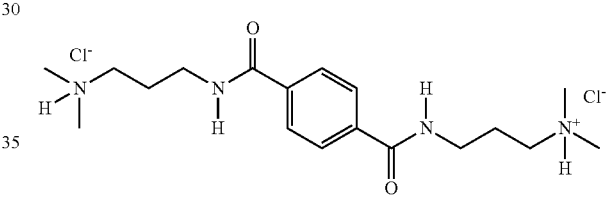

This compound group is prepared in the same way as in the specification for additive 1.

Additive 1

Terephthaloyl dichloride (13.98 g; 1.0 equivalent) was dissolved in a dichloromethane/tetrahydrofuran mixture (200 ml/50 ml). Subsequently, with ice bath cooling, 3-N,N-dimethylaminopropylamine (14.07 g; 2.0 equivalents) was added slowly dropwise. The mixture was stirred at 0° C. for 30 min and at RT for 2 h. The compound was precipitated with hexane (about 400 ml), then filtered off on a glass filter and dried on a rotary evaporator (50-80 mbar, 65° C., 30-45 min). This was followed by subsequent drying under a high vacuum at room temperature overnight.

The compound was characterized by $^1$H-NMR (proton nuclear magnetic resonance spectroscopy) in dimethyl sulfoxide-$d_6$, and with thermal analytical techniques (differential calorimetry and thermogravimetry).

Yield: 27.8 g of fine white powder (99%), slightly hygroscopic.

2. Procedure for Preparing the Binder Polymers

Example 1

A polymerization vessel with stirrer and reflux condenser was charged with
- 201.0 g of deionized water and
- 3.3 g of a 20% strength by weight solution of sodium dodecylbenzenesulfonate and this initial charge was heated to 95° C. with stirring. Then 32.8 g of feed 1 and, 10 min later, 10.9 g of feed 2 were added and the mixture was stirred at this temperature for 5 min. With retention of the temperature, beginning simultaneously, the remainder of feed 1 and the remainder of feed 2 were metered continuously over the course of 150 min into the polymerization batch. After the end of feeds 1 and 2, rinsing was carried out with 7.2 g of deionized water, and the batch was left to postpolymerize for 15 min. During this time, the temperature was set at 90° C. Thereafter, 6.8 g of a 9.5% strength by weight solution of ammonia were metered in over 15 min. Then, over the course of an hour, in parallel, 9.8 g of a 4% strength by weight aqueous tert-butyl hydroperoxide solution and 14.3 g of a 4.6% strength by weight aqueous solution of acetone bisulfite were metered in. Subsequently the reaction batch was stirred for a further 15 min, 38 g of deionized water were added, the mixture was cooled to room temperature and adjusted to a pH of 8.5 with 22.6 g of a 5% strength by weight aqueous sodium hydroxide solution, and filtered through a filter with a 125 µm mesh size.

This gave 1276.7 g of a 51.2% strength by weight dispersion having a pH of 8.4, an LT of 81%, and a particle size of 166 nm. The MFFT was 1° C.

Feed 1
    8.7 g Dowfax® 2A1 in the form of a 45% strength by weight aqueous solution
    26.0 g Lutensol® TO 82 in the form of a 20% strength by weight aqueous solution
    8.5 g acrylic acid (monomer c)
    19.5 g a 50% strength by weight aqueous solution of acrylamide (monomer c)
    357.5 g n-butyl acrylate (monomer a)
    274.3 g methyl methacrylate (monomer b)
    248 g water Feed 2
    0.8 g sodium peroxodisulfate
    30.4 g water

Example 2

A polymerization vessel with stirrer and reflux condenser was charged with
    241.6 g of deionized water, and
    3.4 g of a 31% strength by weight solution of Emulphor® NPS 25
    30.0 g of a 20% strength by weight solution of Emulgator® 825 and this initial charge was heated with stirring to 95° C. Then, simultaneously, feeds 1 and 2 were started. Feed 1 was metered over the course of 240 min and feed 2 over the course of 270 min continuously into the polymerization batch. After the end of feed 2, the batch was allowed to postpolymerize for 30 min more. Thereafter, 19.4 g of a 6.9% strength by weight solution of ammonia were metered in over 10 min. Then, over the course of an hour, in parallel, 4.6 g of a 10% strength by weight aqueous tert-butyl hydroperoxide solution and 17.0 g of a 2.1% strength by weight aqueous solution of ascorbic acid were metered in. Subsequently a further 3.7 g of a 3.4% strength by weight aqueous solution of hydrogen peroxide were added, and the reaction mixture was stirred for a further 30 minutes. Then the batch was cooled to room temperature and filtered through a filter with a 125 µm mesh size.

This gave 1185.1 g of 51.3% strength by weight dispersion having a pH of 8.1, an LT of 91%, and a particle size of 100 nm. The MFFT was 5° C.

Feed 1
    8.6 g Emulphor® NPS in the form of a 31% strength by weight aqueous solution
    14.0 g sodium lauryl sulfate in the form of a 15% strength by weight aqueous solution
    6.0 g acrylic acid (monomer c)
    20.2 g a 50% strength by weight aqueous solution of acrylamide (monomer c)
    319.9 g n-butyl acrylate (monomer a)
    264.0 g methyl methacrylate (monomer b)
    195.2 g water Feed 2
    1.9 g sodium peroxodisulfate
    35.6 g water

Example 3

A polymerization vessel with stirrer and reflux condenser was charged with
    156.0 g of deionized water, and
    26.0 g of a 33% strength by weight polystyrene seed dispersion having a particle size of 30 nm and this initial charge was heated to 82° C. with stirring. Then 4.3 g of feed 2 were added and the mixture was stirred for 5 minutes at this temperature. With retention of the temperature, and beginning simultaneously, feed 1 and the remainder of feed 2 were metered in continuously to the polymerization batch over the course of 180 min. After the end of feeds 1 and 2, the batch was left to postpolymerize for 15 min. Thereafter 22.2 g of a 4.9% strength by weight solution of ammonia were added. Then, over the course of an hour, in parallel, 6.0 g of a 10% strength by weight aqueous tert-butyl hydroperoxide solution and 18.4 g of a 2.0% strength by weight aqueous solution of ascorbic acid were metered in. Subsequently 5.2 g of a 5% strength by weight hydrogen peroxide solution were added, the final pH was set at 7.8-8.5 at 80° C. with 10.7 g of a 17% strength by weight ammonia solution, and the batch was cooled to room temperature and filtered through a filter with a mesh size of 125 µm. This gave 1242.6 g of a 50.3% by weight dispersion having a pH of 7.8, an LT of 77%, and a particle size of 156 nm. The MFFT was 8° C.

Feed 1
    30.0 g Emulan® OG in the form of a 20% strength by weight aqueous solution
    40.0 g Disponil® FES 77 in the form of a 30% strength by weight aqueous solution
    17.9 g acrylic acid (monomer c)
    20.4 g a 50% strength by weight aqueous solution of acrylamide (monomer c)
    333.1 g n-butyl acrylate (monomer a)
    238.8 g styrene (monomer b)
    300.8 g water Feed 2
    1.2 g sodium peroxodisulfate
    15.9 g water

Example 4

A polymerization vessel with stirrer and reflux condenser was charged with
    217.6 g of deionized water, and
    11.6 g of a 33% strength by weight polystyrene seed dispersion having a particle size of 30 nm and this initial charge was heated to 85° C. with stirring. Then 4.8 g of feed 2 were added and the mixture was stirred for 5 minutes at this temperature. With retention of the temperature, and beginning simultaneously, feed 1 and the remainder of feed 2 were metered in continuously to the polymerization batch over the course of 180 min. After the end of feeds 1 and 2, the batch was left to postpolymerize for 30 min. Then, over the course of an hour, in parallel, 12.0 g of a 10% strength by weight aqueous tert-butyl hydroperoxide solution and 15.6 g of a 8.1% strength by weight aqueous solution of acetone bisulfite were metered in. Thereafter the batch was cooled to 60° C. and 12.0 g of a 10% strength by weight solution of sodium hydroxide was metered in over 60 min. After cooling to room temperature, subsequently, the batch was admixed with 2 g of a 12% strength by weight aqueous solution of adipic dihydrazide and 2.4 g of a 5% strength by weight hydrogen peroxide solution, and filtered through a filter with a 125 μm mesh size.

This gave 1265.9 g of a 50.1% strength by weight dispersion having a pH of 8.3, an LT of 56%, and a particle size of 140 nm. The MFFT was 3° C.

Feed 1
  31.6 g sodium lauryl sulfate in the form of a 15% strength by weight aqueous solution
  10.5 g Dowfax® 2A1 in the form of a 45% strength by weight aqueous solution
  82.5 g Lutensol® TO 82 in the form of a 20% strength by weight aqueous solution
  1.7 g acrylic acid (monomer c)
  17.6 g a 50% strength by weight aqueous solution of acrylamide (monomer c)
  353.6 g n-butyl acrylate (monomer a)
  235.8 g styrene (monomer b)
  211.4 g water Feed 2
  1.2 g sodium peroxodisulfate
  46.8 g water 3. Production of the Modified Latex Films Additive 1 was incorporated in the desired amounts with stirring into the undiluted dispersions, until complete dissolution took place. The film was drawn down using a BYK-Gardner® film coater onto polyethylene film, the coated films being dried under laboratory conditions for 24 hours and then stored at 60° C. for 2 days.

TABLE 1

WVT rates for free dispersion films

| Dispersion | Amount of additive 1 used % by weight | WVT acc. to ASTM E 96/E 96M -05 g · m/(m² · d · bar) | WVT acc. to ASTM F-1249 g · m/(m² · d · bar) |
|---|---|---|---|
| Example 1 | 0 | 0.405 (± 0.026) | 0.355 (± 0.019) |
|  | 1.0 | 0.412 (± 0.050) | — |
|  | 1.7 | — | 0.345 (± 0.018) |
|  | 2.5 | 0.455 (± 0.003) | — |
| Example 3 | 0 | 0.316 (± 0.027) | 0.272 (± 0.007) |
|  | 1.0 | 0.326 (± 0.029) | 0.354 (± 0.008) |
|  | 1.7 | 0.353 (± 0.011) | — |
|  | 2.5 | 0.436 (± 0.015) | 0.521 (± 0.151) |

The results show in particular an improvement in the WVT for the somewhat more hydrophobic styrene/acrylate dispersion (example 3), and a significant effect when using 2.5% by weight of additive 1.

4. Production of the Formulations for Coatings

Formulations with and without additive 1 were produced. This was done using an aqueous straight acrylate binder and a styrene acrylate binder.

Coatings on the stated substrates were produced by an application of 300 μm wet, and the WVT rates were measured as described above after drying and storage for 28 days under standard conditions (23° C., 50% relative humidity). Through the use of 3% by weight of additive 1 in the formulation it was possible to improve the WVT in both cases.

TABLE 2

Formulations (all amounts in g)

|  | Concentration (% by weight) | Example 2 | with additive 1 | Example 4 | with additive 1 |
|---|---|---|---|---|---|
| Deionized water | — | 75 | 75 | 75 | 75 |
| AMP ® 90 | 90 | 1.2 | 1.2 | 1.2 | 1.2 |
| Byk ® 346 | 45 | 0.6 | 0.6 | 0.6 | 0.6 |
| Tego Airex ® 901 | 100 | 1.5 | 1.5 | 1.5 | 1.5 |
| Dow Corning ® 51 | 80 | 0.9 | 0.9 | 0.9 | 0.9 |
| Solvenon ® DPM | — | 10.5 | 10.5 | 10.5 | 10.5 |
| Tinuvin ® 1130 | 100 | 3 | 3 | 3 | 3 |
| Example 2 | 51.3 | 105 | 105 | — | — |
| Example 4 | 50.1 | — | — | 105 | 105 |
| Acematt ® TS 100 | 100 | 4.5 | 4.5 | 4.5 | 4.5 |
| Additive 1 | 99 | — | 8.8 | — | 8.8 |
| Collacral ® PU 75 | 24-28 | 3.5 | 3.5 | 7 | 7 |
| Example 2 | 51.3 | 70.5 | 70.5 | — | — |
| Example 4 | 50.1 | — | — | 70.5 | 70.5 |
| Viscoatex ® 730 | 30 | 0.2 | 0.2 | 1.2 | 1.4 |
| Tego Foamex ® 810 | 100 | 1.5 | 1.5 | 1.5 | 1.5 |
| Deionized water | — | 22.1 | 13.3 | 17.6 | 8.6 |

TABLE 3

WVT values of the coatings

| Coating based on | Amount of additive 1 used % by weight | WVT acc. to prEN 1062-2 and ISO DIS 7783 g/(m² · d) |
|---|---|---|
| Example 2 | 0 | 124 (± 12) |
|  | 2.5 | 138 (± 5) |
| Example 4 | 0 | 117 (± 28) |
|  | 2.5 | 144 (± 21) |

The results show that the unmodified, acrylate-based coating has a higher WVT than the somewhat more hydrophobic styrene/acrylate-based coating, and that it improves WVT through addition of additive 1. This effect is stronger more particularly for the more hydrophobic coating based on example 4.

TABLE 4

Definition of the raw materials used

| AMP ® 90 | Neutralizing agent from Angus Chemie GmbH |
| Byk ® 346 | Wetting agent from Byk Chemie GmbH |
| Tego Airex ® 901 | Deaerating agent from Degussa |
| Tego Foamex ® 810 | Defoamer from Degussa |
| Dow Corning ® 51 | Wetting agent from Dow Corning Corporation |
| Solvenon ® DPM | Solvent from BASF SE |
| Tinuvin ® 1130 | Light stabilizer from Ciba Specialty Chemicals |
| Acematt ® TS 100 | Matting agent from Degussa |
| Collacral ® PU 75 | Thickener from BASF SE |
| Viscoatex ® 730 | Thickener from Coatex GmbH |
| Emulphor ® NPS 25 | Emulsifier from BASF SE |
| Dowfax ® 2A1 | Emulsifier from Dow Chemical Company |
| Lutensol ® TO 82 | Emulsifier from BASF SE |
| Emulgator ® 825 | Emulsifier from BASF SE |
| Emulan ® OG | Emulsifier from BASF SE |
| Disponil ® FES 77 | Emulsifier from Cognis GmbH |

The invention claimed is:

1. An aqueous polymer dispersion P, comprising:

0.1% to 10% by weight of at least one additive of formula (I)

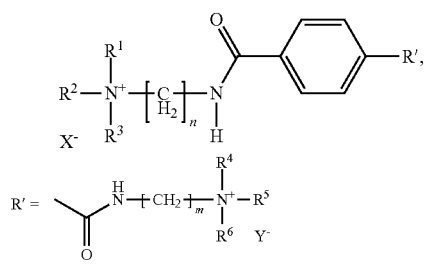

wherein $R^1$, $R^2$, $R^3$, $R^4$, $R^5$, and $R^6$ are H or $C_1$-$C_{n'}$ alkyl, and $R^1$ to $R^6$ are either identical or different, X and Y are Cl, Br, or I, and each of n, n', and m individually represents an integer of 1-8, and wherein the dispersion is obtained by free-radical aqueous emulsion polymerization of a monomer mixture comprising a) 45 to 70 parts by weight of at least one first monomer whose homopolymer has a glass transition temperature $T_g$<20° C., b) 30 to 55 parts by weight of at least one second monomer whose homopolymer has a glass transition temperature $T_g$>50° C., and c) 0 to 30 parts by weight of at least one third monomer.

2. The dispersion of claim 1, wherein a glass transition temperature of a polymer from polymerizing the monomer mixture is 0° C. to 50° C.

3. The dispersion of claim 1, wherein the first monomer a) is at least one selected from the group consisting of a branched ethylenically unsaturated $C_3$-$C_{10}$ olefin, an unbranched ethylenically unsaturated $C_3$-$C_{10}$ olefin, a $C_1$-$C_{10}$ alkyl acrylate, a $C_5$-$C_{10}$ alkyl methacrylate, a $C_5$-$C_{10}$ cycloalkyl (meth)acrylate, a $C_1$-$C_{10}$ dialkyl maleate, and a $C_1$-$C_{10}$ dialkyl fumarate.

4. The dispersion of claim 1, wherein the second monomer b) is at least one selected from the group consisting of styrene, α-methylstyrene, o-vinyltoluene, p-vinyltoluene, vinyl chloride, vinylidene chloride, acrylonitrile, methacrylonitrile, a ($C_1$-$C_4$) alkyl ester of methacrylic acid, and a cycloalkyl ester of methacrylic acid.

5. The dispersion of claim 1, wherein the third monomer c) is present and is at least one monomer compound selected from the group of a monoethylenically unsaturated alkylsulfonic acid, a monoethylenically unsaturated arylsulfonic acid, 2-sulfoethyl (meth)acrylate, sulfopropyl (meth)acrylate, an α,β-unsaturated $C_3$-$C_6$ carboxylic acid, an α,β-unsaturated $C_4$-$C_8$ dicarboxylic acid, an α,β unsaturated $C_4$-$C_8$ dicarboxylic acid, an α,β unsaturated $C_4$-$C_8$ carboxylic acid anhydride, and an α,β unsaturated $C_4$-$C_8$ dicarboxylic acid anhydride, or an alkali metal or ammonium salt of the monomer compound.

6. A process for preparing the dispersion of claim 1, which comprises:
adding at least one additive of formula (I) to a composition comprising the first, second, and third monomers before, during, or after a polymerization.

7. A method of binding a coating material to a substrate, the method comprising:
contacting a substrate with a coating material comprising a binder comprising the dispersion of claim 1.

8. A method of binding a coating to wood, the method comprising:
contacting wood or a wood comprising material with a coating material comprising a binder comprising the dispersion of claim 1.

9. The method of claim 7, wherein the binder has a minimum film formation temperature of below 10° C.

10. A coating material, comprising a binder comprising the dispersion of claim 1.

11. A wood-coating material, comprising a binder comprising the dispersion of claim 1.

12. The method of claim 8, wherein the binder has a minimum film formation temperature of below 10° C.

13. The dispersion of claim 1, wherein the second monomer b) comprises methyl methacrylate.

14. The dispersion of claim 1, wherein the second monomer b) comprises cyclohexyl methacrylate.

15. The dispersion of claim 1, wherein the second monomer b) comprises isobornyl methacrylate.

16. The dispersion of claim 1, wherein the second monomer b) comprises tert-butyl methacrylate.

17. The dispersion of claim 1, wherein the third monomer c) is present and comprises at least one monomer compound selected from the group consisting of vinylbenzenesulfonic acid, acrylamidoethanesulfonic acid, acrylamidopropanesulfonic acid, 2-sulfoethyl (meth)acrylate, and sulfopropyl (meth)acrylate, or an alkali metal or ammonium salt thereof.

18. The dispersion of claim 1, wherein the third monomer c) is present and comprises at least one monomer compound selected from the group consisting of acrylic acid, methacrylic acid, crotonic acid, fumaric acid, maleic acid, maleic anhydride, itaconic acid, and itaconic anhydride, or an alkali metal or ammonium salt thereof.

19. The dispersion of claim 1, wherein the third monomer c) is present and comprises vinylsulfonic acid, or an alkali metal or ammonium salt thereof.

20. The dispersion of claim 1, wherein the third monomer c) is present and comprises methallylsulfonic acid, or an alkali metal or ammonium salt thereof.

* * * * *